(12) United States Patent
DeMartino

(10) Patent No.: US 7,043,250 B1
(45) Date of Patent: May 9, 2006

(54) SYSTEMS AND METHODS FOR FORMING AND OPERATING A COMMUNICATIONS NETWORK

(75) Inventor: Kevin A. DeMartino, Bedford, MA (US)

(73) Assignee: Verizon Corporate Services Group Inc., New York, NY (US)

( * ) Notice: Subject to any disclaimer, the term of this patent is extended or adjusted under 35 U.S.C. 154(b) by 241 days.

(21) Appl. No.: 10/780,205

(22) Filed: Feb. 17, 2004

Related U.S. Application Data (60) Provisional application No. 60/463,275, filed on Apr. 16, 2003.

(51) Int. Cl.
*H04Q 7/20* (2006.01)

(52) U.S. Cl. ............ 455/445; 455/517; 370/313; 370/237; 370/242; 370/216

(58) Field of Classification Search .......... 455/445, 455/517, 410; 370/237, 242, 216, 313
See application file for complete search history.

(56) References Cited

U.S. PATENT DOCUMENTS

| | | | |
|---|---|---|---|
| 6,381,462 B1* | 4/2002 | Charas | 455/452.2 |
| 2004/0042402 A1* | 3/2004 | Galand et al. | 370/237 |
| 2004/0156328 A1* | 8/2004 | Walton et al. | 370/313 |
| 2004/0157611 A1* | 8/2004 | Smith et al. | 455/445 |

* cited by examiner

*Primary Examiner*—Joseph Feild
*Assistant Examiner*—Julio Perez
(74) *Attorney, Agent, or Firm*—Leonard C. Suchyta, Esq.; Finnegan Henderson Farabow et al (57) ABSTRACT

Methods are provided for forming and operating mesh communications networks. A primary application of these methods would be for a network for interconnecting telephone central offices. Compared to current networks, a network based on these methods may provide higher resource utilization efficiency, greater provisioning flexibility, and robustness against a wider range of network failures. These methods may enable protection and restoration of service following a failure to be tailored to the requirements of particular data flows. Mesh networks based on these methods of this invention may be extended seamlessly across contiguous LATA so that the data flow between central offices in different LATAs would not need to be routed through a separate inter-LATA network and would not require long haul transmission lines.

21 Claims, 8 Drawing Sheets

SYSTEMS AND METHODS FOR FORMING AND OPERATING A COMMUNICATIONS NETWORK

REFERENCE TO PENDING PRIOR APPLICATION

This patent application claims benefit of pending prior U.S. Provisional Patent Application Ser. No. 60/463,275, filed on Apr. 16, 2003 by Kevin A. DeMartino for "An Architecture for a Seamless Mesh Network."

TECHNICAL FIELD

This invention relates to methods for communication networking, in general, and specifically methods for forming and operating a communications network with mesh topology.

BACKGROUND

A reliable communications network can be constructed using unreliable nodes and unreliable links. With the appropriate use of redundant network resources, network reliability can be maintained in the face of link and node failures. This redundancy implies some inefficiency in the utilization of network capacity and/or delays in restoring the network to its full transport capability following a failure. There is a tradeoff between utilization efficiency on the one hand, and restoration delays and complexity on the other.

One example of a communication network is a telephone network. In current telephone networks, most subscribers are connected to network nodes, in the form of central offices (COs), by dedicated twisted pair access lines. Typically, a CO and its attached subscribers are arranged in a star topology. However, some subscribers are connected to COs via access rings. Usually, the COs are interconnected by links in the form of fiber optic transmission lines physically forming a mesh topology. Currently, logical connections among COs are established along interlocking rings superimposed on the physical mesh topology of the fiber plant.

A "ring" configuration provides the simplest and most straightforward way to protect against failures so that the network capability can be restored following a failure. In particular, Synchronous Optical Network (SONET) rings have been widely accepted as basis for reliable network design. With this approach, a relatively small number of nodes are interconnected via a ring topology so that between any two nodes (i.e., an "ingress" node and a "egress" node) on the rings, data can flow in two directions around the ring, clockwise and counterclockwise. These two directions represent physically diverse paths so that failures along these paths tend to be independent. Typically, the working (primary) data flow is over a working path in one direction around the ring, while the associated protection (backup) data flow is over a protection path in the opposite direction. For SONET rings, certain bytes of the SONET overhead are used to notify the nodes along the ring when a failure occurs. Based on the indicated failure, source data can be switched to the protection path at its ingress node and protection data can be switched to its destination at the egress node.

Transmission lines, which are deployed in environments that cannot be physically protected, are vulnerable to failures, particularly fiber cuts. SONET rings have been employed very effectively to provide fast restoration following fiber cuts and other types of line failures. In many cases, SONET rings can detect failures and restore service quickly, so that class 4 and class 5 voice switches will not drop calls. It is relatively easy to implement ring-type restoration within SONET equipment without the need to signal network elements outside the ring.

Most COs are end offices (or wire centers), which terminate subscriber access lines. Some COs are limited to interoffice switching. In a network, the average number of access lines per CO is more than 10000, with more access lines per CO in densely populated urban areas and fewer in sparsely populated rural areas.

Since most COs were built to serve local customers, the geographic distribution of COs is driven by the population distribution. Historically, each community (population cluster) had one or more COs, with a single CO in most towns and multiple COs in cities. COs tend to be unevenly distributed in two-dimensional space. However, in moderately populated suburban areas, the distribution is fairly even. Transmission lines interconnecting the COs usually follow the roads or railways, and the distribution of communications traffic tends to be similar to the distribution of transportation traffic.

Local access transport areas (LATAs) are areas that delineate the flow of communication traffic within the United States. Inter-LATA traffic is restricted by government regulations. Within a LATA, traffic is normally handled by a local exchange carrier (LEC), while traffic crossing LATA boundaries is usually handed off to an inter-exchange carrier (IXC). LATA boundaries are seams that impede the free flow of traffic. It is anticipated that in the next several years, the restrictions on inter-LATA services will gradually be lifted, so that the seams within networks may be eliminated.

In most cases, COs are physically interconnected by fiber optic cables containing multiple fibers. Each fiber may contain multiple wavelength multiplexed (WDM) channels. Each WDM channel can support multiple SONET channels. For example, a WDM channel may contain an OC48 signal, which is equivalent to 48 STS-1 signals at the fundamental SONET data rate of 51.84 Mb/s. This physical interconnection network typically has a mesh topology, as illustrated in the network 100 of FIG. 1. Data flowing between a pair of COs may pass through multiple intermediate COs. This is analogous to a passenger remaining on a train that stops at or passes multiple stations before reaching the passenger's destination. A partial SONET channel, a full SONET channel, or a number of SONET channels may be assigned to a data flow between a particular pair of COs. For high traffic connections, a full wavelength channel (or possibly multiple wavelength channels) may be assigned. Switching of SONET and/or WDM signals would be performed at the COs along the connection path.

Figure 1:
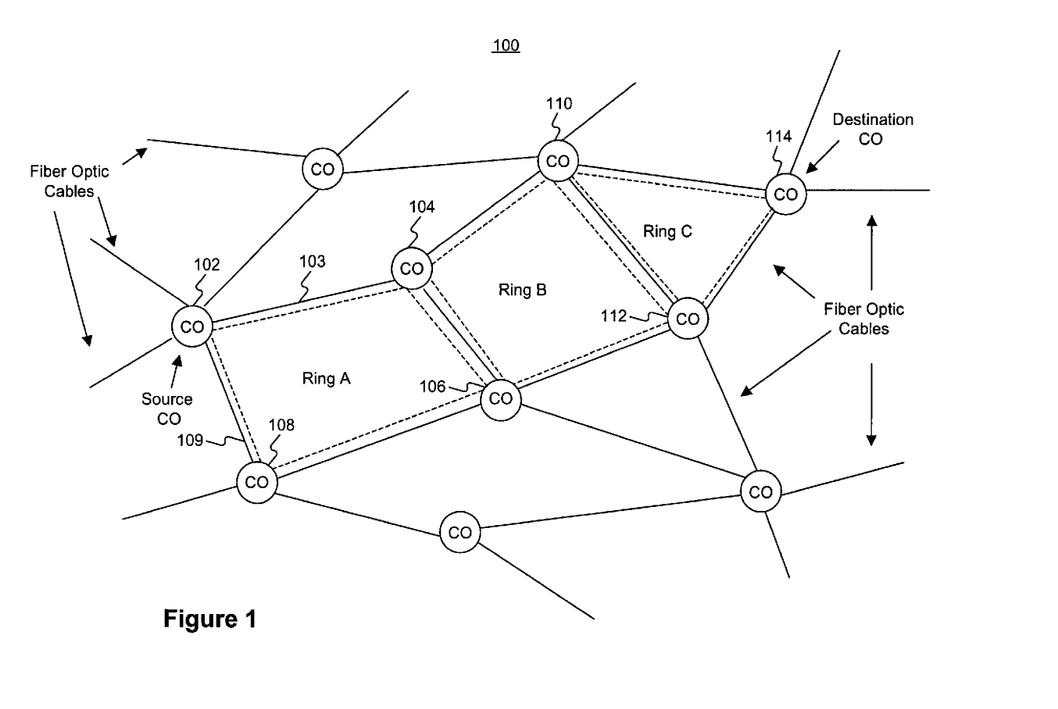
FIG. 1 illustrates a prior art network with logical rings overlaid on a physical fiber plant mesh.

Rings can be logically superimposed on the physical mesh topology of FIG. 1, so that data can be forced to flow along a set of interlocking rings. For example COs 102, 104, 106, and 108 form a ring A; COs 104, 110, 112, and 106 form a ring B, and COs 110, 114, and 112 form a ring C. For a particular data flow, the working and protection data travel in opposite directions around the ring. Once the a path is chosen for the working data (the working path) associated with a particular data flow, the path for protection data (the protection path) for this data flow is constrained. COs connected to multiple rings act as hubs in allowing data to be transferred from one ring to another. Data passing through the network would pass through multiple interlocking rings. In the example shown in FIG. 1, data would traverse rings A, B, and C in flowing from a source, or origin, CO 102 to a destination CO 114. Of course, data flows are usually bi-directional so that data would also flow from destination node 114 to source node 102.

Figure 2:
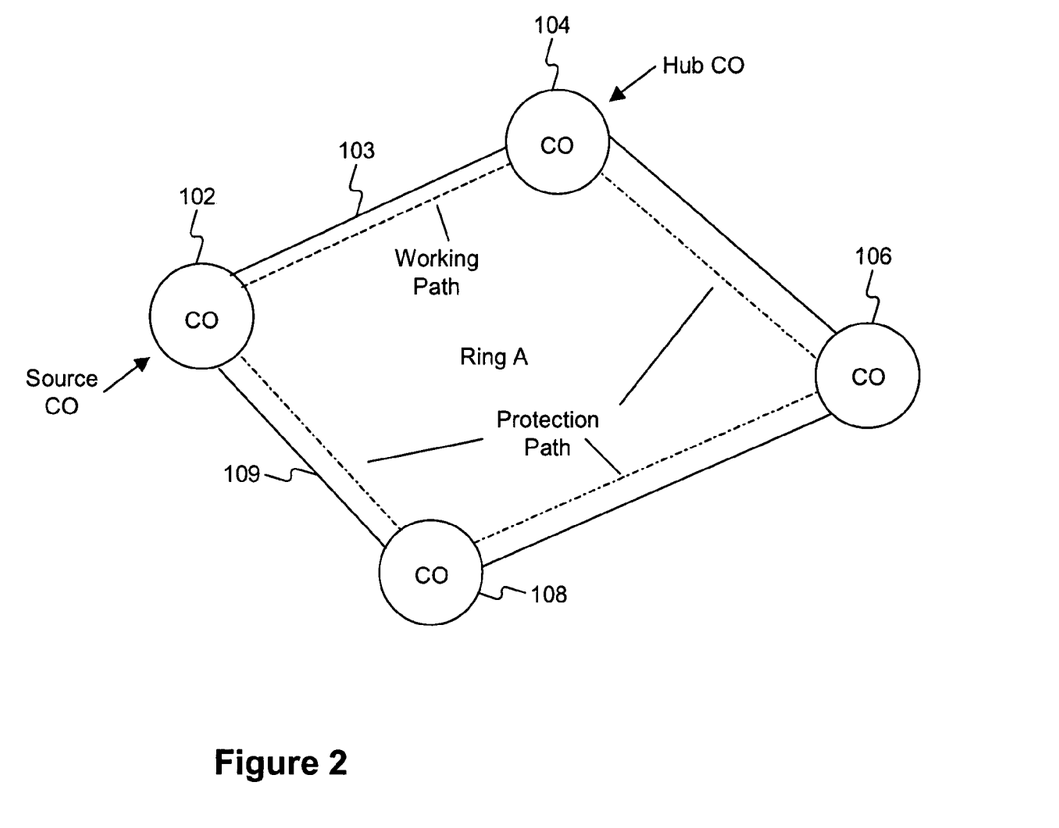
FIG. 2 show an expansion of one of the rings in FIG. 1.

In the case shown by FIG. 1, the working paths associated with this data flow from source node 102 to destination node 114 would be clockwise around rings A, B, and C, while the protection path would be counterclockwise around the rings. This is shown more clearly by FIG. 2, which is an expansion of Ring A. The working path is from CO 102 to CO 104, while the protection path is from CO 102 to CO 108 to CO 106 to CO 104.

Rings are awkward building blocks that impose unnecessary constraints on the operation of the interoffice network. Protection capacity must be reserved around each ring. Typically, the shorter distance between two COs on a ring is chosen for the working path, and the longer distance is chosen for the protection path. Consequently, the capacity reserved for protection is usually greater than the working capacity. Also, the ring structure limits provisioning flexibility so that network capacity may be "stranded," i.e., some capacity will be rendered unusable by protection constraints. For example, consider the case illustrated by FIG. 2. Suppose there is unused capacity on a link between CO 102 and CO 104. This capacity can be assigned to the traffic flow between these two COs only if sufficient capacity is available to be assigned along all the links for protection path from CO 102 to CO 108 to CO 106 to CO 104. If capacity is not available somewhere along this protection path, the excess capacity on the link 103 between CO 102 and CO 104 is stranded.

Establishing protection on a ring-by-ring basis limits restoration capabilities in the face of node failures and multiple failures. A failure at a hub CO might prevent data from being transferred from one ring to another. For example, a failure at CO 104 in FIG. 2 may prevent data from being handed off between rings A and B (FIG. 1), which would interrupt the data flow between the source and destination COs. Also, two failures on a ring could disable both the working and protection paths and prevent data from passing through the ring. For example, failures of link 103 between CO 1 and CO 2 and link 109 between CO 102 and CO 108 (FIG. 2) would disable the data flow between the source and destination nodes (FIG. 1). It is therefore desirable to provide methods for more efficiently configuring networks and transmitting data over the network, while maintaining the desired reliability.

SUMMARY

Consistent with the invention, a method is provided for transmitting data between multiple pairs of origin nodes and destination nodes on a mesh network having a plurality of nodes interconnected via links. For a pair of communicating nodes, the method comprises establishing a working virtual connection comprising a working path and a procedure for transferring data along the working path. The working path comprises a plurality of working path nodes, including an origin node and a destination node, and links interconnecting the working path nodes. The working path nodes include information defining the working virtual connection.

The method also comprises establishing a protection virtual connection comprising a protection path and a procedure for transferring data along the protection path. The protection path comprises a plurality of protection path nodes, including the origin node and the destination node, and links interconnecting the protection path nodes. The protection path nodes include information defining the protection virtual connection.

The method also comprises transmitting data from the origin node to the destination node over the working virtual connection, detecting a failure along the working path, and transmitting a failure notification to the origin and destination nodes. The method further comprises receiving the failure notification at the origin and destination nodes and relating this notification to virtual connections affected by the failure. The method also comprises automatically ceasing transmission of data over the working virtual connections affected by the failure, and automatically transmitting data over the protection virtual connections corresponding to the working virtual connections affected by the failure. The method also comprises automatically ceasing the reception of data over the working virtual connections affected by the failure, and automatically receiving data over the protection virtual connections corresponding to the working virtual connections affected by the failure. In the method, establishing a working virtual connection comprises selecting at a working path node a link from a set of all links connected to the working path node; and establishing a protection virtual connection comprises selecting at a protection path node a link from a set of all links connected to the node, such that the protection path and its associated working path have no links in common and no nodes in common except for the source and destination node. In the method, a node may simultaneously function as source node for multiple connections, a destination node for multiple virtual connections, and an intermediate node for multiple virtual connections.

DETAILED DESCRIPTION

Introduction

Consistent with the present invention, methods are provided for forming and operating mesh communication networks. One application of these methods is in forming and operating a network for interconnecting nodes in the form of telephone central offices (COs). However, it is to be understood that the invention is not so limited and may be applied to other types of communication networks.

Consistent with the invention, an architecture is specified for a mesh-based interoffice network. Compared to current networks, this network can provide higher resource utilization efficiency, more flexible provisioning, and robustness against a wider range of network failures. This architecture may be extended seamlessly across LATA boundaries to interconnect COs over a large geographic area.

A network consistent with this invention could be used to fully connect all the COs within a geographic area so that data flows between any pair of COs in this area could be supported. Physical and virtual connections are established between pairs of communicating nodes. Unlike the situation with ring-based networks, the paths for these connections are not constrained to follow pre-defined rings.

Many data flows require protection so that service can be restored quickly when a network failure occurs. Unlike current protection/restoration schemes, protection and restoration methods consistent with the present invention may be tailored to the requirements of particular data flows. For high-value, time-sensitive data flows, a protection method is provided that permits very fast restoration of service, but requires dedicated protection channels. For high-value data flows that can tolerate longer restoration times, a method is provided that permits better protection efficiency, but somewhat longer restoration times. For data flows that can tolerate a reduced data rate, a method involving graceful degradation is provided. For low value data flows, protection is not provided, and new connections would need to be established following a failure that caused a service interruption.

Unlike ring-based networks, mesh-based networks can be seamless. In the disclosed interoffice network, data may flow through many intermediate COs between the source CO and the destination CO. The network could be extended seamlessly across LATA boundaries to cover a large contiguous geographic area. With this extended network, connections between COs in different LATAs would not need to be routed through a separate inter-LATA network and would not require long haul transmission lines.

Consistent with the invention, methods are provided for forming a mesh network and transporting data through this mesh, for protection and restoration, and for extending the mesh over a large geographic area. Methods and apparatus consistent with this invention can be implemented with currently available transmission and switching equipment.

Mesh Formation and Data Transport

Figure 3:
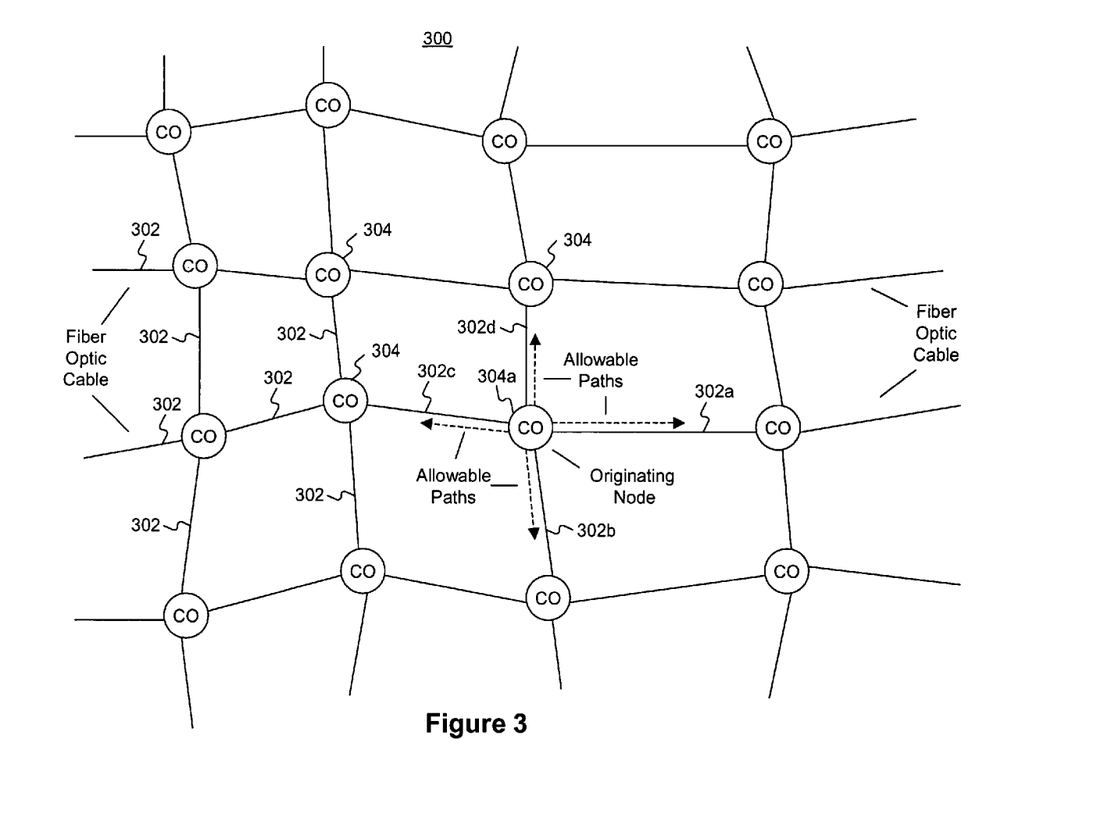
FIG. 3 shows a mesh network consistent with the present invention for interconnecting telephone central offices.

Referring now to FIG. 3, there is shown a mesh network 300 consisting of multiple nodes in the form of telephone COs 304 physically interconnected by links 302 in the form of fiber optic transmission lines. In this case, the nodes are of degree 4, i.e., each CO is directly connected to four other COs. This is analogous to a rectangular grid of roads, where the roads can be viewed as the links and the intersections can be viewed as nodes of degree 4, i.e. the place where four roads come together. A vehicle at the intersection can travel four directions, e.g., north, south, east, or west, and can efficiently move to any point in the grid. Similarly, data at any CO can be sent on any of the four links attached to the CO.

The network 300 of FIG. 3 provides much greater flexibility in provisioning connections than current networks. With network 300 of FIG. 3, any node can communicate with any other node, either directly or through one or more intermediate nodes. At each node, traffic can be transmitted on any link. Data originating at a node can be sent on any of the four links, and data terminating at a node can be received an any of the links connected to the node. Assuming data is not normally looped back, data arriving at an intermediate node can be forwarded on any of the three remaining links. This flexibility in the routing of data flows is different from typical interoffice networks in North America, where data must be sent over pre-established logical rings overlaid on top of the physical network.

Although some local individual restrictions may be imposed, traffic flow through network 300 is preferably unconstrained, so that data can preferably be sent along any path through the mesh. Unlike current networks where rings constraining the data flows are overlaid on a physical mesh, network 300 overlays a mesh of data flows on a physical mesh of the fiber plant. Thus, the functional (data flow) architecture and the physical architecture have the similar topologies.

The arrangement of FIG. 3 is the most natural way to interconnect COs, which are normally distributed in two-dimensional space along roadways. Note that with this arrangement, the maximum distance (or the maximum number of hops) between a pair of nodes is equal to the square root of 2 times the distance along a straight line, and the average distance is only about 20% more than the straight line distance. Where obstructions (e.g., bodies of water) get in the way, it may become necessary, or desirable from a cost perspective, to reduce the degree of the mesh. In areas where the average degree is reduced, the average distance that must be traveled between a pair of nodes increases, but this would not significantly degrade the operation of the network.

Links 302 may comprise fiber optic transmission lines consisting of one or more fiber optic cables. The transmission lines may contain multiple fiber pairs and associated transmission line elements, such as optical amplifiers. Normally, signals are transmitted in only one direction along a fiber so that a fiber pair would consist of a transmit fiber and a receive fiber, as viewed from either end of the line. Each fiber may support multiple communication channels, such as time division multiplexed (TDM) channels. These TDM channels would include Synchronous Optical Network (SONET) channels and tributaries, where SONET refers to a set of North American standards for transmission of digital data. Alternately, a fiber could support TDM channels and tributaries in accordance with the Synchronous Digital Hierarchy (SDH) standards, the international standards for transmission of digital data. Some fibers may support multiple wavelength division multiplexed (WDM) channels, with each of these WDM channels capable of supporting multiple SONET (or SDH) channels and tributaries.

In network 300, COs 304 may contain communications equipment, patch panels, and cables. At COs 304 in FIG. 3, traffic is sent to and received from subscribers connected to the CO via access lines (not shown). Typically, a CO may support between 5000 and 20000 subscribers. Communications equipment within a CO 304 is used for switching, multiplexing and demultiplexing, and transmission and reception of signals. Electrical and optical cables and patch panels may be used to interconnect equipment within the CO and to connect transmission/reception elements to access lines and to interoffice transmission lines. Switching equipment may include TDM switches for switching voice, TDM data, and SONET channels (and tributaries), and data switches, such as routers, Asynchronous Transfer Mode (ATM) switches, and Frame Relay switches, for switching packetized data.

Between each pair of communicating nodes 304, one or more physical layer connections are established. Establishing a physical layer connection involves defining a path through the network and allocating communication channels along this path. Defining a path through the network involves specifying a sequence of nodes and links, starting at the source node and ending at the destination node. Data is carried in communication channels within links 302, between the communicating nodes. Data is switched onto and off of communication channels using switches in the nodes 304. Setting up a connection involves configuring switches, multiplexers, and, in some cases, patch panels in the communicating nodes and in the intermediate nodes. The communication channel dedicated to a physical layer connection may involve a portion of a SONET channel, a full SONET channel, or multiple SONET channels. Multiple data flows may be multiplexed on a physical layer connection between nodes. Alternately, a particular data flow may be supported by multiple physical layer connections, which is referred to as inverse multiplexing.

Defining a path through the network involves specifying a sequence of nodes and links, starting at a source node and ending at a destination node. For some data flows, virtual connections are established. Establishing a virtual connection involves defining a path from a source node to a destination node and setting up procedures for sending data along this path. Virtual connections are similar to physical connections, except that with virtual connections, network resources, such as communication channels, are shared rather than dedicated. Typically, a physical layer connection would support multiple virtual connections. Virtual connections may be used in conjunction with ATM and Frame Relay services.

Consistent with the invention, virtual connections in the form of label switched paths (LSPs) are established for a particular data flow between communicating nodes in accordance with Generalized Multiprotocol Label Switching (GMPLS) standards. Two unidirectional LSPs can be set up to support a bi-directional data flow. LSPs can be nested so that an LSP can contain other LSPs and can support multiple data flows. Generally, link capacity is shared by multiple LSPs. The Resource Reservation Protocol (RSVP), which is a GMPLS standard protocol, would be used to reserve network capacity along the paths of the LSPs.

LSPs can be used to support Internet Protocol (IP) data flows. For example, LSPs can be set up between routers in ingress (source) and egress (destination) nodes. An LSP may traverse routers in intermediate between the ingress and egress nodes. Typically, there would be multiple LSPs associated with a particular router, which can act as an ingress router for some LSPs, an egress router for other LSPs, and an intermediate router for still other LSPs. The router would switch IP packets onto and off of these LSPs.

With network 300, the amount of stranded capacity is minimized, and there is more flexibility in provisioning physical and virtual connections than with current ring-based networks. For a connection to be provisioned, each link along a connection must have sufficient available capacity to support the data flow for this connection. The probability of being able to find at least one path that can be provisioned increases as the number of paths increases. Unlike the case for ring-based networks, there are many potential paths for a connection through network 300. From an origin node 304a in FIG. 3, a connection can be routed along any one of the four connected links 302a–302d. At intermediate nodes, the connections can follow any of three links (any link other than the link on which incoming data arrives). As the length of the connection path increases, the number of potential paths increases exponentially.

Protection/Restoration Methods

Mesh networks can support end-to-end path protection which is more robust than protection against failures of specific links or specific nodes. With end-to-end path protection, service can be restored even if there are multiple link and node failures along the working path. Methods consistent with the invention involve end-to-end path protection of data flows between network elements in nodes, such as COs. Working and protection paths are established between pairs of communicating nodes. In the absence of a network failure, the working paths are employed for transferring data between source and destination nodes. When a failure occurs that disrupts data flows along the working paths, the protection paths are used to transfer data and restore service.

As described previously, a working path can be established along any route between a pair of communicating nodes. Protection paths are established in a similar manner, prior to the occurrence of a failure. However, the protection path is configured such that it is spatially diverse from its associated working path. In other words, the working and protection paths do not have any links or nodes in common, except for the origin and destination nodes. This ensures that if one or more links and/or intermediate nodes along the working path fail, service can be quickly restored. The spatial diversity restriction can be relaxed for data flows that can tolerate a reduced level of protection.

Consistent with the invention, a main method is thus provided for transmitting data between multiple pairs of origin nodes and destination nodes on a mesh network having a plurality of nodes interconnected via links. For a pair of communicating nodes, the method comprises establishing a working virtual connection comprising a working path and a procedure for transferring data along the working path. The working path comprises a plurality of working path nodes, including an origin node and a destination node, and links interconnecting the working path nodes. The working path nodes include information defining the working virtual connection.

The method also comprises establishing a protection virtual connection comprising a protection path and a procedure for transferring data along the protection path. The protection path comprises a plurality of protection path nodes, including the origin node and the destination node, and links interconnecting the protection path nodes. The protection path nodes include information defining the protection virtual connection.

The method also comprises transmitting data from the origin node to the destination node over the working virtual connection, detecting a failure along the working path, and transmitting a failure notification to the origin and destination nodes. The method further comprises receiving the failure notification at the origin and destination nodes and relating this notification to virtual connections affected by the failure. The method also comprises automatically ceasing transmission of data over the working virtual connections affected by the failure, and automatically transmitting data over the protection virtual connections corresponding to the working virtual connections affected by the failure. The method also comprises automatically ceasing the reception of data over the working virtual connections affected by the failure, and automatically receiving data over the protection virtual connections corresponding to the working virtual connections affected by the failure. In the method, establishing a working virtual connection comprises selecting at a working path node a link from a set of all links connected to the working path node; and establishing a protection virtual connection comprises selecting at a protection path node a link from a set of all links connected to the node, such that the protection path and its associated working path have no links in common and no nodes in common except for the source and destination node. In the method, a node may simultaneously function as source node for multiple connections, a destination node for multiple virtual connections, and an intermediate node for multiple virtual connections.

Data flows can be classified according to time sensitivity. Highest time sensitive data flows are those carrying voice traffic. When a failure occurs, these data flows must be quickly restored to prevent voice circuits from being disconnected. In particular, voice circuits may become disconnected if the voice signal is interrupted for more than 150 ms. To prevent this from happening, maximum restoration time requirements have been imposed on network elements, and time budgets have been established for the various components contributing to the restoration time. According to current network requirements, failures must be detected within 10 ms, and then connections must be restored within 50 ms. For types of traffic other than voice, such as Internet traffic, longer restoration times can be tolerated. However, existing networks impose these stringent requirements on the entire interoffice network regardless of the type of traffic being carried by within a particular data flow.

One method for ensuring uninterrupted service is to transmit data simultaneously from a source node to a destination node along two diverse paths, referred to as "1+1 path protection." At the destination end, the destination node would normally received data from the working path. However, when a failure occurs, the destination nodes switch to receiving data from the protection path. Service is restored almost instantaneously, so that the 50 ms restoration time requirement may easily be met.

Figure 4:
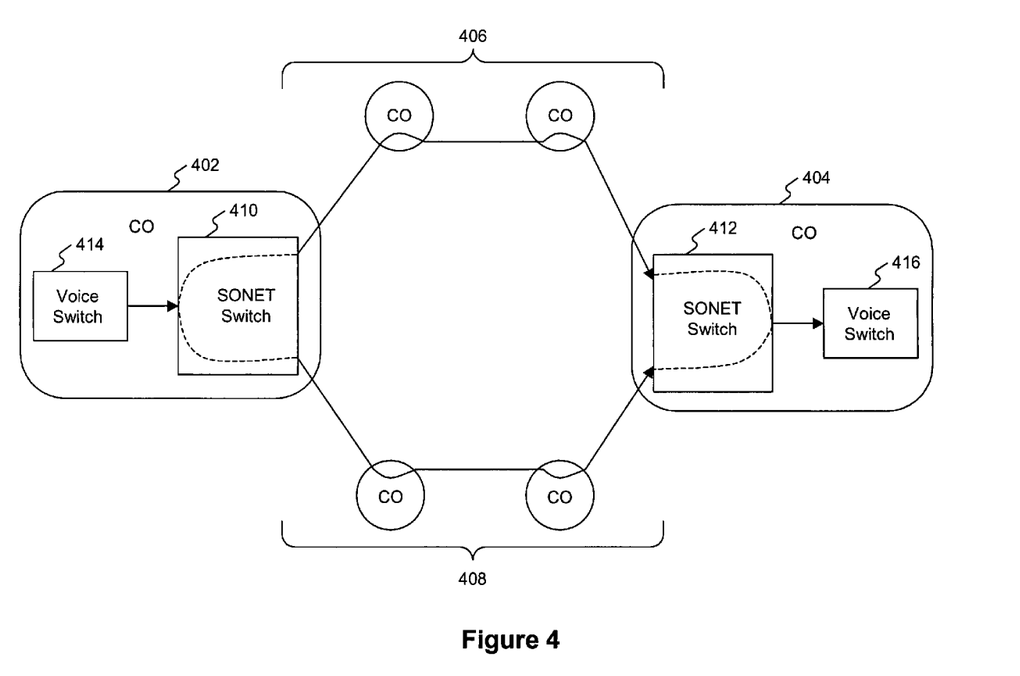
FIG. 4 illustrates 1+1 path protection, consistent with the present invention, for time-sensitive traffic.

This type of operation is illustrated in FIG. 4 for the case of traffic flowing between voice switches in a source node 402 and a destination node 404. In this case, traffic between a pair of voice switches is simultaneously transmitted along two separate paths 406 and 408, each of which traverses multiple COs. Although the figure shows traffic flowing in only one direction, in reality, voice traffic would flow in both directions between the switches. Full duplex physical connections along diverse paths would thus be established between nodes 402 and 404. Network channels are thus dedicated to this data flow along both paths 402 and 404. Consequently, the protection capacity that is set aside would be approximately 100% of the working capacity. In this case, the protection efficiency, which is defined as the ratio of the working capacity to the sum of the working plus protection capacities, would be approximately 50%. If a failure occurs along the working path, the receivers in the form of SONET switches 410 and 412, in nodes 402 and 404, respectively, would switch to receiving data from protection path 408 and pass this protection data to respective voice switches.

Consistent with the invention, a method, similar to the main method described above, is provided for establishing a 1+1 protection method. The method comprises establishing a plurality of working connections, including at least one working physical connection, the working physical connection comprising a working path and a set of channels allocated to the working physical connection. The method further comprises establishing a plurality of protection connections including at least one protection physical connection, the protection physical connection comprising a protection path and a set of channels allocated to the physical connection. Next, the method comprises transmitting data through the at least one working physical connection, simultaneously transmitting data through the protection physical connection associated with the at least one working physical connection, and simultaneously receiving the data at the destination node from both the working physical connection and the protection physical connection. Finally, the method comprises selecting the data from the working physical connection, detecting a failure on the working physical connection, and selecting data from the associated protection physical connection.

The 1+1 path protection method described above may be applied to data flows with the highest time sensitivity. It may be applied to the data flow between class 4 (tandem) switches, which are switches used in class 4 central offices (also referred to as toll offices or tandem offices). This method may also be applied to the data flow between a class 5 switch in an end office (class 5 central office), which is connected to subscriber access lines, and a class 4 switch in a tandem office. It could also be applied to connections between two class 5 switches, connections involving class 4/5 combination switches, or to other TDM data flows. Even though 1+1 protection is inefficient, it is typically more efficient than ring protection, where the protection capacity is usually greater than the working capacity.

Obviously, the 1+1 protection method described above can also be used for data traffic, with data transmitted simultaneously along two diverse paths. However, another approach can provide much better efficiencies than dedicated 1+1 protection. This approach, which is referred to as "virtual 1+1 protection", involves establishing virtual connections rather than physical connections between a pair of network elements. Protection connections would be established prior to the occurrence of a failure, which enables fast restoration of service following a failure. With the virtual 1+1 protection method, protection capacity can be shared among multiple protection connection. This leads to improved protection efficiency.

Consistent with the invention, a method, similar to the main method described above, is provided, comprising establishing a plurality of working connections, including a working virtual connection; establishing a plurality of protection connections, including a protection virtual connection transmitting data at the origin node via the working virtual connections; receiving data at the destination node from the working virtual connection; and selecting the data from the working virtual connection. When a failure is detected on the working virtual connection, the method comprises transmitting data at the origin node via the protection virtual connection, receiving data at the destination node from the protection virtual connection, and selecting data from the associated protection virtual connection. This method may be applied to data flows with the second highest time sensitivity.

Figure 5:
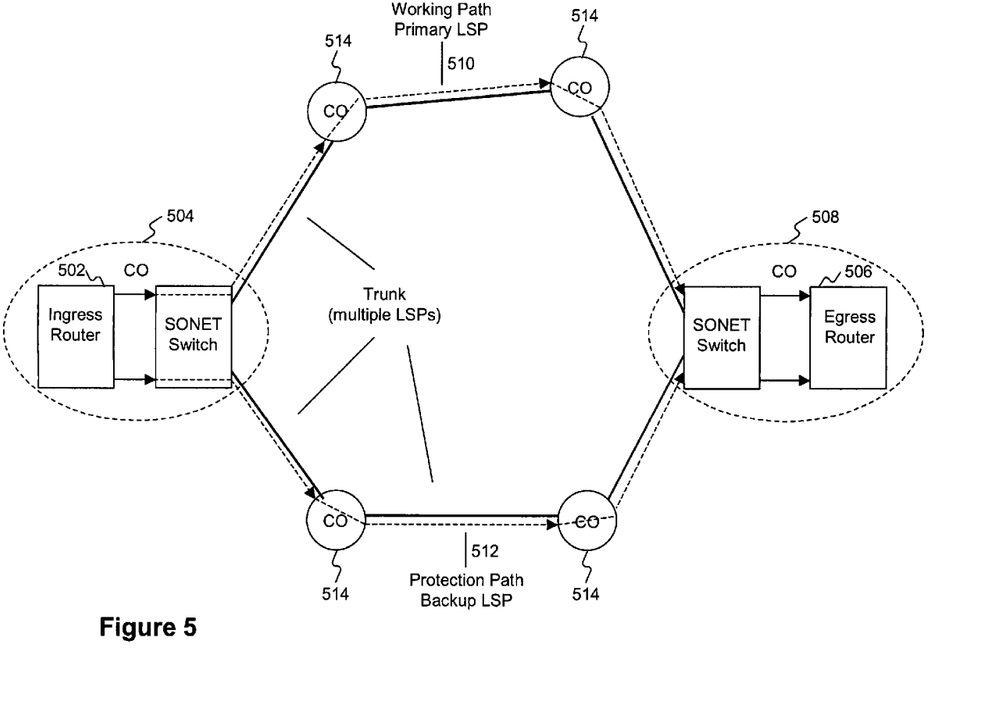
FIG. 5 illustrates virtual connections along working and protection paths, consistent with the present invention.

FIG. 5 illustrates a specific implementation of virtual 1+1 protection. In this case, GMPLS protocols are used to establish label switched paths (LSPs), which can be viewed as virtual connections, between an ingress router 502 in a source node CO 504 and an egress router in CO 506 in a destination node CO 508. For the data flow from an ingress to egress router, both a working path LSP 510 and a protection path LSP 512 are set up, with the protection path being spacially diverse and disjoint from the working path. Separate LSPs are set up for data flowing in the opposite direction, where router 506 in CO 508 becomes the ingress router and the router 502 in CO 504 becomes the egress router. Thus, there would be four LSPs, two working LSPs and two protection LSPs, associated with the data flow between a pair of routers. (Only two of these LSPs are show in FIG. 5.) There could be more than one data flow between a pair of routers, which would result in 8 or more LSPs between these routers. There could also be data flows originating and terminating from other routers (e.g., routers within the other COs 514 in FIG. 5) that would traverse routers 502, 506 in COs 504, 506. Typically a router would be the ingress point for multiple LSPs and the egress point for multiple LSPs.

Using the Resource Reservation Protocol (RSVP), network capacity is reserved along the path of all working LSPs. In the absence of failures, data flows only in the working LSPs. Although the protection LSPs are established from end to end (ingress to egress routers), data does not flow in the protection LSPs. Optionally, some keep-alive packets may occasionally be transmitted over the protection LSPs. Some capacity is reserved for protection. However, this capacity could be shared among multiple protection LSPs whose corresponding working LSPs are disjoint. This will ensure that high protection efficiencies can be achieved.

Figure 6:
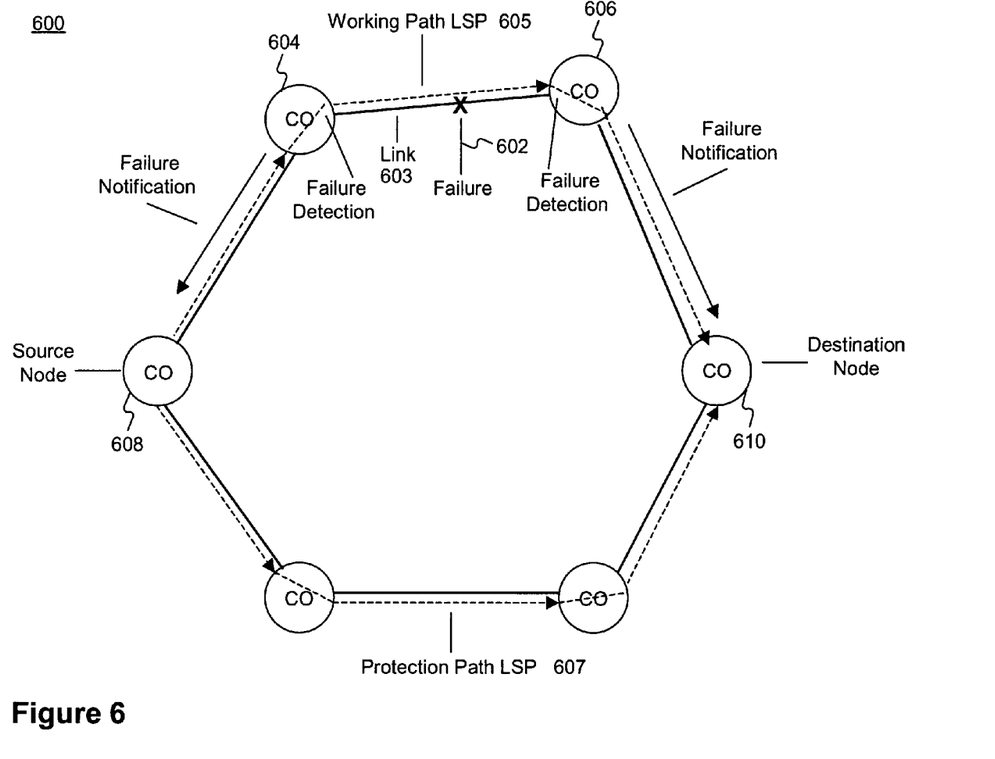
FIG. 6 illustrates the operation of virtual 1+1 protection, consistent with the present invention.

Failures are detected by network elements in the COs. FIG. 6 illustrates a network 600 with a link failure (e.g., a fiber cut) 602 on link 603, which would be detected by a network elements in adjacent COs (nodes) 604, 606. In network 600, a working path LSP 605 and a protection path LSP 607 have been established between a severe node 608 and a destination node 610. For link failure 602, all the SONET signals on failed link would be lost, which would be easily detected by SONET elements in COs 604, 606 connected to link 603. These elements then send failure notifications to origin node 608 and destination node 610 and identify the particular failure that occurred, in this case, the failure of link 603. This failure information would be passed on to ingress and egress routers, within COs 608 and 610, respectively. The routers contain lookup tables relating failures to LSPs. The ingress router in origin CO 608 determines from a look-up table the set of LSPs originating from CO 608 that are affected by the failure of link 603, including path 605 therein. The ingress router in CO 608 then switches to transmit data associated with working LSPs affected by the failure (including working path 605) over the corresponding protection LSPs. The egress router in CO 610 begins receiving data from the protection LSPs associated with affected data flows. In this particular case, LSPs in the opposite direction (originating from the router in CO 610 and terminating at the router in CO 608) would also be affected by the failure of link 603. Thus, the router in CO 610 would also switch data onto protection LSPs, and the router in CO 608 would start accepting data from protection LSPs associated with affected data flows.

FIG. 6 is oversimplified in that it only shows two LSPs 605 and 607. Most failures would affect multiple LSPs. For example, the failure of link 603 would affect working LSPs between CO 604 and CO 604, between CO 608 and CO 606, and between CO 604 and CO 610, among others. For a large mesh network, a large number of LSPs may be affected by a failure. Consequently, a router may need to switch to transmit data over and receive data from a large number of protection LSPs following a failure. For each failure, the lookup table in the router would contain multiple entries corresponding to the LSPs originating or terminating at particular nodes that are affected by the particular failure.

Table entries are provided for the most likely failures, which include link failures, total node failure, and partial node failures. Partial node failures may include equipment failures and cable disconnects within a CO. With many partial node failures, the impact is less than with the typical link failures, and only a few LSPs may be affected. For example, a failure in transmission equipment in a CO would affect only LSPs in a particular channel along the transmission direction, and switching to and from protection LSPs may be required for only a few data flows. However, switching unaffected data flows would have minimal negative consequences. This alleviates problems associated with isolating failures and relating LSPs to particular failures.

Failure information is relayed to all nodes in a network. The restoration time for the virtual 1+1 protection method is limited by the time it takes for a failure notification to propagate back to the ingress and egress routers and for the switched data to propagate along the protection path. Assuming that the times required to process failure information are relatively short, the restoration time would be on the order of the sum of the propagation time for the working and protection paths, which would be acceptable for most data flows, i.e., those having moderate time sensitivity. For failures that are not included in the lookup tables (the unlikely failures), restoration would be slower. The routers at both ends would eventually detect the interruption of the data flow and would start using the protection LSPs. Keep-alive packets would be sent during lulls in the data flow to enable this interruption to be detected.

Virtual connections along working and protection paths can be established using ATM or Frame Relay protocols. Consequently, the protection and restoration methods described above would also be used in conjunction with ATM and Frame Relay data flows.

For selected data flows that can tolerate reduced data rates, protection/restoration methods involving graceful degradation would be employed. In this case, two combination working/protection virtual connections would be established following the methods described above. The data flow would be split and sent along both these connections. If a failure disrupts the data flow along one of these connections, the data rate would be reduced at its source using flow control methods, and all the data for the particular data flow would be sent over the unaffected connection.

Protection connections may not be provided for low value data flows, such as certain Internet data flows. For these data flows, only working connection may be established. If a failure interrupts some of these data flows, new working connections may need to be established before service could be restored.

Data traffic is growing at a much faster rate than voice traffic and is expected to become the dominant component of the traffic volume at some point in the relatively near future. Thus, only a small percentage of the total traffic flow may require dedicated protection, i.e. 1+1 path protection. Data flows for most of the traffic may employ virtual 1+1 protection, protection with graceful degradation, or no protection. This implies that the overall protection efficiency would be considerably higher than the protection efficiency of ring-based networks.

Methods for Seamlessly Extending the Mesh Network

Figure 7:
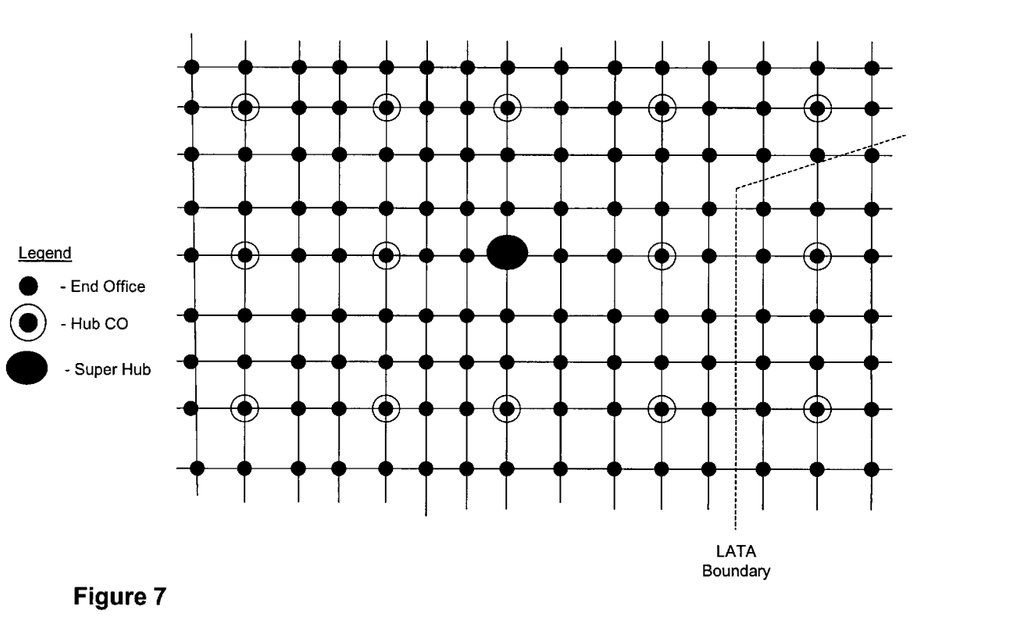
FIG. 7 shows physical relationships among three levels of nodes and illustrates seamless extension of the mesh network across a LATA boundary, and consistent with the present invention.

The mesh network of FIG. 3 is scaleable. It can be extended seamlessly to cover a large geographic area. FIG. 7 illustrates a method for interconnecting many nodes spread over a large area. The nodes are distributed on two-dimensional grid. In general, the distribution would not be uniform so that a length of a line in FIG. 7 representing a network link may not necessarily be a true measure of the distance between nodes. Ideally, all the nodes would be nodes of degree 4, where each node is directly connected to four other nodes. However, the degree of some nodes may be reduced if obstructions made it too difficult or too costly, or if traffic patterns did not justify this high a level of connectivity.

In the network of FIG. 7, traffic may pass through many intermediate nodes between the origin and destination node, much like an express train passing through stations without stopping. Data is transported over a long distances without using traditional long-haul transmission lines. As shown by FIG. 7, the network may extend across LATA boundaries for contiguous LATAs. Data may be sent through multiple LATAs without leaving the network to be transported by an IXC network. The network of FIG. 7 may thus employ the protection/restoration methods described in the previous section.

As the number of nodes in a mesh network increases, the number of possible paths through the network increases exponentially. Although not all these paths will be disjoint and many of these paths will be unnecessarily long, the increase in the number of paths enables the provisioning flexibility and protection efficiency to increase as the size of the mesh increases. This distinguishes the network of FIG. 7 from ring-based networks, where the provisioning flexibility and protection efficiency may decrease as the size of the network increases.

In FIG. 7, there are three types, or orders, of COs (nodes), namely, end offices, hub COs, and super hubs. These orders of nodes are similar, in that all three orders may support a large number of subscriber access lines, which are not shown in the figure. Thus, traffic may originate and terminate at all three orders of nodes. Originating traffic is multiplexed onto links shown in FIG. 7 and demultiplexed onto the attached access lines. The primary difference between orders of nodes is related to traffic flow. Some traffic originating at an end office would be backhauled to a hub CO, where it is then routed through the network. Correspondingly, some traffic terminating at an end office would flow through a hub on its way to the terminating office. To accommodate these traffic demands, the hubs preferably contain switching equipment with a greater throughput capability than the corresponding equipment at end offices. In all other respects, hubs may not be distinguishable from end offices.

There is a tradeoff between switching complexity and cost, and between transport complexity and cost. Backhauling the traffic to hub nodes permits the complexity and cost of the equipment at end offices, which represent the vast majority of the nodes, to be reduced. However, the backhauling restriction may also artificially reduce the number potential paths through the network, which in turn reduces provisioning flexibility and increases distances for both working paths and protection paths. As a result, more network capacity will be used for working paths and more capacity must be reserved for protection. Another way to view restrictions on data flow is that as the size of the mesh increases, the ratio of protection capacity to working capacity will decrease at slower rate than the rate for a mesh without these restrictions. Similarly, the ratio of stranded capacity to working capacity will decrease at a slower rate. Also, restrictions on data flow reduce the robustness of the network in being able to recover from failures.

Super hubs may be interspersed with the hubs and end offices on the two-dimensional grid of FIG. 7. For example, a hub may be associated with a group of nine hubs, a hub may be associated with a group of nine end offices. Super hubs would handle a higher traffic volume and would require a greater switching capacity than hubs and end offices. Also, super hubs would provide connections to other networks. Otherwise, super hubs may be similar to the other orders of nodes and perform functions similar to those performed by hubs and end offices.

Figure 8:
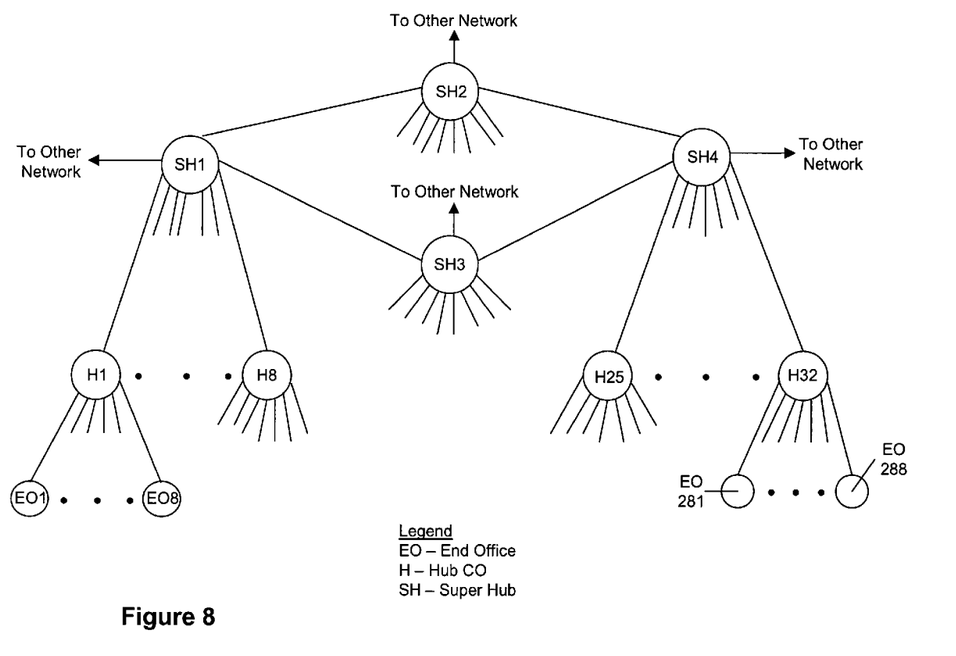
FIG. 8 is a schematic diagram of the functional relationships between three levels of nodes for a regional network.

The network of FIG. 8 is an example of an embodiment providing a regional network covering multiple LATAs. FIG. 8 illustrates the hierarchical relationship between end offices and hubs and between hubs and super hubs. Unlike FIG. 7, which shows the spatial relationship among the nodes, FIG. 8 is a schematic diagram representing the logical connectivity among the nodes. Only working connections are shown. In this case, each hub H1–H32 has eight subordinate end offices and each super hub SH1–SH4 has eight subordinate hubs. Each hub is also an end office, or, equivalently, contains a co-located end office. Similarly, each super hub contains a co-located hub and a co-located end office. All the end offices, hubs and super hubs in FIG. 8 may be connected to subscribers. In densely populated areas, the number of end offices per hub and the number of hubs per super hub may be greater than 8. In the network of FIG. 8, there are a total of 324 nodes, in the form of COs. Of these 324 nodes, 288 are end offices (EO1–EO288) (excluding 36 end offices co-located with hubs or super hubs), 32 hubs (H1–H32) (excluding hubs co-located with super hubs) and 4 are super hubs (SH1–SH4).

To implement the protection/restoration methods described in the previous section, working and protection paths are established between pairs of end offices, between pairs of hubs, and between pairs of super hubs. Typically, a connection between similar types of nodes would support multiple data flows. The working and protection paths between a pair of nodes preferably follow diverse routes. The working path between a pair of end offices may traverse one or more hubs. In this case, the corresponding protection path preferably traverses a completely different set of hubs. Similarly, the working path between a pair of hubs, may traverse one or more super hubs. The corresponding protection path preferably traverses a completely different set of super hubs.

The network described here can be used as a building block for a national or global network. Similar networks can be constructed in other regions, and these networks can be interconnected. As shown in FIG. 8, the super hubs may have interfaces with other networks, and super hubs may perform gateway functions. The super hubs in FIG. 8 may establish connections with super hubs in other networks. Data originating within the network of FIG. 8 may be multiplexed in the super hubs and sent to other networks. Data received from other network may be demultiplexed in the super hubs and distributed to hubs, which then distributes this data to the end offices.

Although methods consistent with the invention have been described in connection with telephone networks in which nodes are present in the form of COs, the invention is not so limited. Rather, the invention may also be employed in connection with other types of networks.

The invention claimed is:

1. A method for transmitting data between multiple pairs of origin nodes and destination nodes on a mesh network having a plurality of nodes interconnected via links, comprising for a pair of communicating nodes:

establishing a working virtual connection comprising a working path and a procedure for transferring data along the working path, the working path comprising a plurality of working path nodes, including an origin node and a destination node, and links interconnecting the working path nodes; each working path node including information defining the working virtual connection;

establishing a protection virtual connection comprising a protection path and a procedure for transferring data along the protection path, the protection path comprising a plurality of protection path nodes, including the origin node and the destination node, and links interconnecting the protection path nodes each protection path node including information defining the protection virtual connection;

transmitting data from the origin node to the destination node over the working virtual connection;

detecting a failure along the working path and transmitting a failure notification to the origin and destination nodes;

receiving the failure notification at the origin and destination nodes and relating this notification to virtual connections affected by the failure;

automatically ceasing transmission of data over the working virtual connections affected by the failure, and automatically transmitting data over the protection virtual connections corresponding to the working virtual connections affected by the failure; and automatically ceasing the reception of data over the working virtual connections affected by the failure, and automatically receiving data over the protection virtual connections corresponding to the working virtual connections affected by the failure;

wherein:

establishing a working virtual connection comprises selecting at a working path node a link from a set of all links connected to the working path node;

establishing a protection virtual connection comprises selecting at a protection path node a link from a set of all links connected to the node, such that the protection path and its associated working path have no links in common and no nodes in common except for the source and destination nodes; and a node may simultaneously function as source node for multiple virtual connections, a destination node for multiple virtual connections, and an intermediate node for multiple virtual connections.

2. A method as recited in claim 1, comprising:

establishing a plurality of working connections, including at least one working physical connection, the working physical connection comprising a working path and a set of channels allocated to the working physical connection;

establishing a plurality of protection connections, including at least one protection physical connection, the protection physical connection comprising a protection path and a set of channels allocated to the protection physical connection;

transmitting data through at least one working physical connection, simultaneously transmitting through the protection physical connection associated with the at least one working physical connection;

simultaneously receiving the data at the destination node from both the working physical connection and the protection physical connection;

selecting the data from the working physical connection;

detecting a failure on the working physical connection; and selecting data from the associated protection physical connection.

3. A method as recited in claim 2, comprising classifying data according to time sensitivity and applying the method of claim 2 only to data with the highest time sensitivity.

4. A method as recited in claim 1, comprising:

establishing a plurality of working connections, including a working virtual connection;

establishing a plurality of protection connections, including a protection virtual connection;

transmitting data at the origin node via the working virtual connections;

receiving data at the destination node from the working virtual connection;

detecting a failure on the working virtual connection;

transmitting data at the origin node via the protection virtual connection; and receiving data at the destination node from the protection virtual connection.

5. A method as recited in claim 4, comprising classifying data according to time sensitivity and applying the method of claim 4 only to data with the second highest time sensitivity.

6. The method of claim 1, wherein:

the nodes comprise telephone central offices; and the links comprise fiber optic cables.

7. The method of claim 6, wherein the network extends across LATA boundaries.

8. The method of claim 7, wherein the network covers a geographic area comprising contiguous LATAs.

9. The method of claim 8 wherein a connection between central offices in different LATAs is routed through nodes of the network.

10. The method of claim 6, wherein the fiber optic cables comprise multiple fibers.

11. The method of claim 10, wherein the fibers comprise transmission lines supporting multiple channels.

12. The method of claim 11, wherein the channels comprise at least one of a SONET and an SDH channel.

13. The method of claim 1, comprising establishing physical connections between nodes by switching channels and interconnecting fibers at the nodes.

14. The method of claim 1 wherein at least one working virtual connection and its associated protection virtual connection each comprises a label switched path (LSP).

15. The method of claim 14 wherein the working virtual connection and the protection virtual connection each comprises at least one LSP in accordance with GMPLS standards.

16. The method of claim 15 wherein at least one physical connection is shared by multiple LSPs.

17. The method of claim 1 wherein the nodes comprise at least two orders of nodes.

18. The network of claim 17 wherein a higher order node supports at least one lower order node in its local geographic area.

19. The method of claim 18 wherein data flowing between a pair of nodes supported by different higher order nodes is routed through the different higher order nodes.

20. The method of claim 19 wherein data flowing between a pair of nodes supported by different higher order nodes is routed through the different higher order nodes, and through intermediate nodes.

21. The method of claim 17 wherein the functions performed by lower order nodes are also performed by at least some of the higher order nodes.

* * * * *